US010681383B2

(12) United States Patent
Ye et al.

(10) Patent No.: US 10,681,383 B2
(45) Date of Patent: Jun. 9, 2020

(54) METHODS FOR PALETTE MODE CONTEXT CODING AND BINARIZATION IN VIDEO CODING

(71) Applicant: HFI Innovation Inc., Zhubei, Hsinchu County (TW)

(72) Inventors: Jing Ye, San Jose, CA (US); Jungsun Kim, San Jose, CA (US); Shan Liu, San Jose, CA (US); Kai Zhang, Beijing (CN); Tzu-Der Chuang, Zhubei (TW); Weijia Zhu, Beijing (CN)

(73) Assignee: HFI INNOVATION INC., Zhubei, Hsinchu County (TW)

( * ) Notice: Subject to any disclaimer, the term of this patent is extended or adjusted under 35 U.S.C. 154(b) by 0 days.

(21) Appl. No.: 15/563,788

(22) PCT Filed: Apr. 8, 2016

(86) PCT No.: PCT/CN2016/078859
§ 371 (c)(1),
(2) Date: Oct. 2, 2017

(87) PCT Pub. No.: WO2016/161974
PCT Pub. Date: Oct. 13, 2016

(65) Prior Publication Data
US 2018/0098092 A1    Apr. 5, 2018

Related U.S. Application Data

(60) Provisional application No. 62/173,030, filed on Jun. 9, 2015, provisional application No. 62/168,151, filed
(Continued)

(30) Foreign Application Priority Data

May 5, 2015 (WO) ................. PCT/CN2015/078269

(51) Int. Cl.
*H04N 19/70* (2014.01)
*H04N 19/91* (2014.01)
(Continued)

(52) U.S. Cl.
CPC ............. *H04N 19/70* (2014.11); *H04N 19/13* (2014.11); *H04N 19/176* (2014.11);
(Continued)

(58) Field of Classification Search
CPC .. H04N 19/593; H04N 19/463; H04N 19/176; H04N 19/70; H04N 19/13; H04N 19/91
See application file for complete search history.

(56) References Cited

U.S. PATENT DOCUMENTS

2014/0301474 A1  10/2014  Guo et al.
2015/0010053 A1   1/2015  Xu et al.
(Continued)

FOREIGN PATENT DOCUMENTS

CN        104301737 A     1/2015
WO      2015/004441 A1    1/2015
(Continued)

OTHER PUBLICATIONS

Ttofis, C., et al.; "Towards accurate hardware stereo correspondence: A Real-Time FPGA Implementation of a Segmentation-Based Adaptive Support Weight Algorithm;" Mar. 2012; pps. 1-6.
(Continued)

*Primary Examiner* — Zaihan Jiang
*Assistant Examiner* — Susan X Li
(74) *Attorney, Agent, or Firm* — McClure, Qualey & Rodack, LLP

(57) ABSTRACT

A method of video coding using the palette coding mode with reduced complexity by sharing context(s) between context-based entropy coding of syntax element for the last run type mode and context-based entropy coding of syntax element for the run type mode is disclosed. A method with reduced complexity for binarization of the syntax element associated with the number of palette indices of the current block is disclosed, where Rice parameter is derived for the
(Continued)

number of palette indices without the need for a division or table lookup operation. In another method, the syntax element to specify whether transpose process is applied to associated palette indices of the current block is signalled in the bitstream for the current block in a location after the syntax element to specify a last run type mode for the current block.

3 Claims, 4 Drawing Sheets

Related U.S. Application Data on May 29, 2015, provisional application No. 62/145,578, filed on Apr. 10, 2015, provisional application No. 62/144,529, filed on Apr. 8, 2015.

(51) Int. Cl.
*H04N 19/463* (2014.01)
*H04N 19/593* (2014.01)
*H04N 19/13* (2014.01)
*H04N 19/176* (2014.01)

(52) U.S. Cl.
CPC ......... *H04N 19/463* (2014.11); *H04N 19/593* (2014.11); *H04N 19/91* (2014.11)

(56) References Cited

U.S. PATENT DOCUMENTS

| | | | | |
|---|---|---|---|---|
| 2015/0264348 | A1* | 9/2015 | Zou | H04N 19/70 |
| | | | | 375/240.02 |
| 2015/0373340 | A1* | 12/2015 | Zou | H04N 19/176 |
| | | | | 375/240.24 |
| 2016/0100171 | A1* | 4/2016 | Karczewicz | H04N 19/13 |
| | | | | 375/240.02 |
| 2017/0171560 | A1* | 6/2017 | Kim | H04N 19/593 |

FOREIGN PATENT DOCUMENTS

| | | |
|---|---|---|
| WO | 2015041647 A1 | 3/2015 |
| WO | 2016/123488 A1 | 8/2016 |

OTHER PUBLICATIONS

Sullivan, G., et al.; "Meeting report of the fifth meeting of the Joint Collaborative Team on Video Coding(JCT-VE);" Joint Collaborative Team on Video Coding (JCT-VC) of ITU-T SG16 WP3 and ISO/IEC JTC1/SC29/WG11; Mar. 2011; pp. 1-162.

Seregin, V.; "Non-CE1 Cross-check for simplification for index map coding in palette mode;" Joint Collaborative Team on Video Coding (JCT-VC) of ITU-T SG 16 WP 3 and ISO/IEC JTC 1/SC 29/WG 11; Feb. 2015; pp. 1-6.

Kim, J., et al.; "CE1-related simplification for index map coding in palette mode;" Joint Collaborative Team on Video coding (JCT-VC) of ITU-T SG 16 WP 3 and ISO/IEC JTC 1/SC 29/WG 11; Feb. 2015; pp. 1-8.

Ye, J., et al.; "CE1-related Palette Mode Context and Codeword Simplification;" Joint Collaborative Team on Video coding (JCT-VC) of ITU-T SG 16 WP 3 and ISO/IEC JTC 1/SC 29/WG 11; Jun. 2015; pp. 1-8.

International Search Report dated Jul. 6, 2016, issued in application No. PCT/CN2016/078869.

Oshi, R., et al.; "High Efficiency Video Coding (HEVC) Screen Content Coding Draft 3;" Joint Collaborative Team on Video Coding (JCT-VC) of ITU-T SG 16 WP 3 and ISO/IEC JTC 1/SC 29/WG 11; 20th Meeting; Geneva, CH; Feb. 2015; ps. 1-567.

* cited by examiner

METHODS FOR PALETTE MODE CONTEXT CODING AND BINARIZATION IN VIDEO CODING

CROSS REFERENCE TO RELATED APPLICATIONS

The present invention claims priority to U.S. Provisional Patent Application Ser. No. 62/144,529, filed on Apr. 8, 2015, U.S. Provisional Patent Application Ser. No. 62/145,578, filed on Apr. 10, 2015, U.S. Provisional Patent Application Ser. No. 62/168,151, filed on May 29, 2015, U.S. Provisional Patent Application Ser. No. 62/173,030, filed on Jun. 9, 2015, and PCT Patent Application, Serial No. PCT/CN2015/078269, filed on May 5, 2015. The U.S. Provisional Patent Applications and the PCT Patent Application are hereby incorporated by reference in their entireties.

FIELD OF THE INVENTION

The present invention relates to palette coding for video data. In particular, the present invention relates to various techniques for reducing complexity and/or increasing throughput related to syntax elements associated with palette coding.

BACKGROUND AND RELATED ART

High Efficiency Video Coding (HEVC) is a new coding standard that has been developed in recent years. In the High Efficiency Video Coding (HEVC) system, the fixed-size macroblock of H.264/AVC is replaced by a flexible block, named coding unit (CU). In recent HEVC development, palette-based coding is being used for screen content coding (SCC). The syntaxes for palette coding mainly consist of two parts. One is signalling palette table and the other is signalling the index map of the block (i.e., a CU) which represents the information of the block coded. For the index map, number of indices, last run_type flag and grouped indices are signalled. After signalling index information, a pair of run type and number of run is repeatedly signalled. At last, group of escape values is signalled, if necessary.

In HEVC document JCTVC-T1005 (Joshi, et al., *HEVC Screen Content Coding Draft Text* 3, Joint Collaborative Team on Video Coding (JCT-VC) of ITU-T SG 16 WP 3 and ISO/IEC JTC 1/SC 29/WG 11, 20th Meeting: Geneva, CH, 10-18 Feb. 2015, Document: JCTVC-T1005), the palette indices are grouped and signalled in the front of the coded data for a corresponding block (i.e., before palette_run_mode and palette_run syntax elements in a bitstream for the current block). On the other hand, the escape pixels are coded at the end of the coded data for the corresponding block. The syntax elements, palette_run_mode and palette_run are coded between palette indices and escape pixels. FIG. 1 illustrates an exemplary flowchart for index map syntax signalling according to JCTVC-T1005. The number of indices (110), last run_type flag (130) and grouped indices (120) are signalled. After signalling index information, a pair of run type (140) and number of runs (150) is repeatedly signalled. At last, a group of escape values (160) is signalled, if necessary.

In JCTVC-T1005, the last_palette_run_type_flag uses its own context to code. The context table is shown in Table 1, where initial values (i.e., initValue) for palette_run_type_flag and last_palette_run_type_flag are specified.

TABLE 1

| Initialization | ctxIdx of palette_run_type_flag and last_palette_run_type_flag | | |
|---|---|---|---|
| variable | 0 | 1 | 2 |
| initValue | 154 | 154 | 154 |

Furthermore, palette_run_type_flag and last_palette_run_type_flag, each having one context (ctxIdx=0), are specified in the following table.

TABLE 2

| Syntax element | binIdx | | | | | |
|---|---|---|---|---|---|---|
|  | 0 | 1 | 2 | 3 | 4 | >=5 |
| ... | ... | ... | ... | ... | ... | ... |
| palette_transpose_flag | 0 | na | na | na | na | na |
| num_palette_indices_idc | by-pass | by-pass | by-pass | by-pass | by-pass | by-pass |
| last_palette_run_type_flag | 0 | na | na | na | na | na |
| palette_run_type_flag | 0 | na | na | na | na | na |
| palette_index_idc | by-pass | by-pass | by-pass | by-pass | by-pass | by-pass |

BRIEF SUMMARY OF THE INVENTION

A method of video coding using the palette coding mode with reduced complexity by sharing context(s) between context-based entropy coding of syntax element for the last run type mode and context-based entropy coding of syntax element for the run type mode is disclosed. In particular, the context-based entropy coding corresponds to context-adaptive binary coding (CABAC) and the CABAC coding for the syntax element corresponding to the last run type mode and the syntax element corresponding to the run type mode share one single context.

A method with reduced complexity for binarization of the syntax element associated with the number of palette indices of the current block is also disclosed. When the palette coding is applied to the current block, it generates one or more coded symbols corresponding to palette coding modes comprising a copy-index mode and a copy-above mode. The copy-index mode represents a number of consecutive indices all having the same index value by signalling the index value and the number of runs. The number of palette indices is associated with the index values signalled for the copy-index modes of the current block. A Rice parameter is derived for the number of palette indices and a Truncated Rice code is applied to the number of palette indices according to the derived Rice parameter to generate a prefix part. A conventional approach to the Rice parameter derivation requires a division operation. Embodiment of the present invention reduces the complexity by avoiding the division operation for Rice parameter derivation. For example, the Rice parameter can be equal to (2+MaxPaletteIndex/M), where M is a power-of-2 integer to avoid the need for the division operation related to MaxPaletteIndex/M. According to JCTVC-T1005, the variable MaxPaletteIndex specifies the maximum possible value for a palette index for the current coding unit. The value of MaxPaletteIndex is set equal to CurrentPaletteSize−1+palette_escape_val_present_flag. In another example, the Rice parameter can be equal to (2+(MaxPaletteIndex>>N)), and where N is a positive integer and ">>" corresponds to a right-shift operation.

In yet another example, the Rice parameter can be equal to $((L+(MaxPaletteIndex)>>N))$, and where L and N are positive integers.

In yet another method, the syntax element to specify whether transpose process is applied to associated palette indices of the current block is signalled in the bitstream for the current block in a location after the syntax element to specify a last run type mode for the current block.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Last Palette Run Type Signalling

Figure 1:
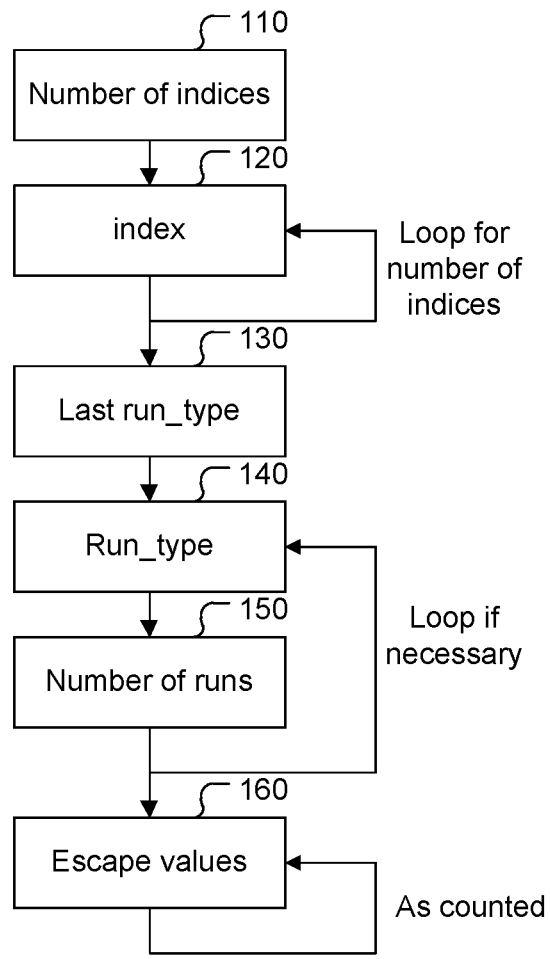
FIG. 1 illustrates an exemplary palette index map syntax signalling according to HEVC (High Efficiency Video Coding) based Screen Content Coding Test Module Version 4 (SCM-4.0).

As shown in FIG. 1, a flag indicating whether the last run_type is copy_index or copy_above can be signalled before or after signalling indices. Also, the last run_type flag can be signalled before or after signalling the number of indices. The location of the last run_type can be anywhere in the bitstream for the block as long as it is signalled before the runs are signalled.

In order to improve the performance, in one embodiment of the present invention, the last_palette_run_type_flag can share the context of palette_run_type_flag. In the existing practice, both last_palette_run_type_flag and palette_run_type_flag are coded using context-based entropy coding. Furthermore, the context-based entropy coding for last_palette_run_type_flag and palette_run_type_flag uses different contexts. In this case, the parsing process for derivation of ctxInc for the syntax element palette_run_type_flag and last_palette_run_type_flag should be as below:

Inputs to this process are the current sample location (xC, yC) specifying the sample relative to the top-left luma sample of the picture.

Output of this process is the variable ctxInc.

The variable ctxInc is derived as follows: ctxInc=0. The assignment of ctxInc to syntax elements with context coded bins should be modified as below, where the text enclosed in a box indicates deletion. Since the last_palette_run_type_flag shares the context of palette_run_type_flag, there is no need of separate context for last_palette_run_type_flag.

TABLE 3

| syntax element | binIdx | | | | | |
|---|---|---|---|---|---|---|
| | 0 | 1 | 2 | 3 | 4 | >=5 |
| ... | ... | ... | ... | ... | ... | ... |
| palette_transpose_flag | 0 | na | na | na | na | na |
| num_palette_indices_idc | by-pass | by-pass | by-pass | by-pass | by-pass | by-pass |
| last_palette_run_type_flag | 0 | na | na | na | na | na |
| Same context for last_palette_run_type_flag and palette_run_type_flag | 0 | na | na | na | na | na |
| palette_index_idc | by-pass | by-pass | by-pass | by-pass | by-pass | by-pass |

Palette Run Type Signalling

The signalling of the run type according to JCTVC-T1005 is shown in FIG. 1. In this application, various techniques to improve the coding efficiency related to run type signalling are disclosed.

Run Length Based Run_Type Coding

In the first embodiment, the number of consecutive copy_index can be signalled instead of a series of 0/1 bits. After each number indicating consecutive copy_index is signalled, one syntax element for copy_above follows. A symbol, END is used to indicate the end of run_type coding, where a predefined value is used for END. When the signalled value is not END, the run length based run_type coding is repeated. The table below shows two simple examples incorporating the above embodiment.

TABLE 4

| | Run type (0: copy_index, 1: copy_above) | Last run type flag | Signalled values |
|---|---|---|---|
| (1) | 000001000100101 | 1 | 5, 3, 2, 1, END |
| (2) | 00000100010010 | 0 | 5, 3, 2, 1, END |

Both example (1) and example (2) above show identical signalled values. These two cases are differentiated by the last run_type flag. If the last run_type flag is 1 (i.e., copy_above), the series of run types corresponds to example (1). If the last run_type flag is 0 (i.e., copy_index), the series of run types corresponds to example (2).

In the second embodiment, since the first pixel is always coded using the copy_index mode, the number of consecutive copy_index modes at the beginning should never be zero. Furthermore, there will be always a non-zero number of consecutive copy_index modes between two copy_above modes. Therefore, signalled values can be reduced by 1 to improve the coding efficiency. Examples incorporating the above embodiment are shown in the following table.

TABLE 5

| | Run type (0: copy_index, 1: copy_above) | Last run type flag | # of consecutive copy index | Signalled values |
|---|---|---|---|---|
| (1) | 000001000100101 | 1 | 5, 3, 2, 1 | 4, 2, 1, 0, END |
| (2) | 00000100010010 | 0 | 5, 3, 2, 1 | 4, 2, 1, 0, END |

In the third embodiment, when the number of indices is already known and the series of run types ends with consecutive copy_index (i.e., last copy_above can follow), the last part of consecutive copy_index can be derived as (number of indices–signalled number of copy_index) without signalling the number of last consecutive copy_index. If the last flag is 1, copy_index will be added as the last run_type at final stage. Examples according to this embodiment are shown in the following table.

TABLE 6

|     | Run type (0: copy_index, 1: copy_above) | Last run type flag | Number of indices | # of consecutive copy index | Signalled values |
| --- | --- | --- | --- | --- | --- |
| (1) | 000001000100101 | 1 | 11 | 5, 3, 2, 1 | 4, 2, 1, END |
| (2) | 00000100010010  | 0 | 11 | 5, 3, 2, 1 | 4, 2, 1, END |
| (3) | 00000           | 0 | 5  | 5          | END |
| (4) | 000001          | 1 | 5  | 5          | END |
| (5) | 010000          | 0 | 5  | 1, 4       | 0, END |

In the fourth embodiment, when the last value to be skipped (e.g. number of last consecutive copy_index) is smaller than the predefined number for END signal, the last value is signalled and END signal is skipped. For example, the predefined value for END can be 3 and examples according to this embodiment are shown in the following table.

TABLE 7

|     | Run type (0: copy_index, 1: copy_above) | Last run type flag | Number of indices | # of consecutive copy index | Signalled values |
| --- | --- | --- | --- | --- | --- |
| (1) | 000001000100101 | 1 | 11 | 5, 3, 2, 1 | 4, 2, 1, 0 |
| (2) | 00000100010010  | 0 | 11 | 5, 3, 2, 1 | 4, 2, 1, 0 |
| (3) | 000001000000    | 0 | 11 | 5, 6       | 4, END |

In the fifth embodiment, syntax element, END is signalled adaptively. When the number of indices is smaller than the predefined number for END, the predefined number is derived as (number of indices–1).

In the sixth embodiment, syntax element END is not signalled at all. Every number of consecutive copy_index is signalled. The accumulated number of copy_index and the number of indices are compared. If both numbers are identical, the parsing process stops. Therefore, signalling of END is not needed. Examples according to this embodiment are shown in the following table.

TABLE 8

|     | Run type (0: copy_index, 1: copy_above) | Last run type flag | Number of indices | # of consecutive copy index | Signalled values |
| --- | --- | --- | --- | --- | --- |
| (1) | 000001000100101 | 1 | 11 | 5, 3, 2, 1 | 4, 2, 1, 0 |
| (2) | 00000100010010  | 0 | 11 | 5, 3, 2, 1 | 4, 2, 1, 0 |
| (3) | 000001000000    | 0 | 11 | 5, 6       | 4, 5 |

In the seventh embodiment, syntax element for END is always signalled without signalling the number of indices. Number of indices can be derived from the first embodiment or the second embodiment without the need for signalling the number of indices. Examples according to this embodiment are shown in the following table.

TABLE 9

|     | Run type (0: copy_index, 1: copy_above) | Last run type flag | # of consecutive copy index | Signalled values |
| --- | --- | --- | --- | --- |
| (1) | 000001000100101 | 1 | 5, 3, 2, 1 | 4, 2, 1, 0, END |
| (2) | 00000100010010  | 0 | 5, 3, 2, 1 | 4, 2, 1, 0, END |
| (3) | 00000           | 0 | 5          | 4, END |
| (4) | 000001          | 1 | 5          | 4, END |

For examples (1) and (2) in the above table, the total number of copy_index modes can be derived as 11 after parsing the END signal. For examples (3) and (4), the total number of copy_index can be derived as 5.

In the eighth embodiment, when the number of signalled copy_above mode is already known, and the series of run types ends when the current number of copy_above mode is equal to the number of signalled copy_above mode. If the last flag is 0, the last copy_above mode is removed as shown in examples (2), (3) and (5) in the following table, where the removed modes are shown within double parentheses.

TABLE 10

|     | Run type (0: copy_index, 1: copy_above) | Last run type flag | Number of copy_above mode | # of consecutive copy index | Signalled values |
| --- | --- | --- | --- | --- | --- |
| (1) | 000001000100101    | 1 | 4 | 5, 3, 2, 1 | 4, 2, 1, 0 |
| (2) | 00000100010010((1))| 0 | 4 | 5, 3, 2, 1 | 4, 2, 1, 0 |
| (3) | 00000((1))         | 0 | 1 | 5          | 4 |
| (4) | 000001             | 1 | 1 | 5          | 4 |
| (5) | 010000((1))        | 0 | 2 | 1, 4       | 0, 3 |

In the ninth embodiment, when the number of index groups minus 1 is already known, the series of run types ends when the number of parsed index groups is equal to the signalled number of index groups. If the last flag is 1, a copy_index will be added as the last run_type at final stage. Examples according to this embodiment are shown in the following table.

TABLE 11

| Run type (0: copy_index, 1: copy_above) | Last run type flag | Number of index group − 1 | # of consecutive copy index | Signalled values |
|---|---|---|---|---|
| (1) 000001000100101 | 1 | 3 | 5, 3, 2, 1 | 4, 2, 1, 0 |
| (2) 00000100010010 | 0 | 3 | 5, 3, 2, 1 | 4, 2, 1, 0 |
| (3) 00000 | 0 | 0 | 5 | 4 |
| (4) 000001 | 1 | 0 | 5 | 4 |
| (5) 010000 | 0 | 1 | 1, 4 | 0, 3 |

In the tenth embodiment, the value of END is predefined (e.g. 2). When the number of END minus 1 (the number of "2" minus 1) is already known, the series of run types ends when the number of parsed "2" is equal to the signalled number of END. If the last flag is 1, a copy_index will be added as the last run_type at final stage. Examples according to this embodiment are shown below, where "2" in brackets corresponds to predefined value for END.

TABLE 12

| Run type (0: copy_index, 1: copy_above) | Last run type flag | Number of END − 1 (i.e., 2 − 1) | # of consecutive copy index | Signalled values |
|---|---|---|---|---|
| (1) 000001000100101 | 1 | 1 | 5, 3, 2, 1 | 4, 2, 1, 0, [2] |
| (2) 000001000010010 | 0 | 0 | 5, 4, 2, 1 | 4, 3, 1, 0, [2] |
| (3) 00000 | 0 | 0 | 5 | 4, [2] |
| (4) 000001 | 1 | 0 | 5 | 4, [2] |
| (5) 010000 | 0 | 0 | 1, 4 | 0, 3, [2] |

Binarization of Number of Consecutive Copy_Index

In the above embodiments, various techniques to convert the run types for a block into coding elements (e.g. signalled run values). The value indicating the number of consecutive copy_index needs to be binarized. The binarized values may be further compressed by entropy coding before the values are included in the bitstream. Various binarization techniques are disclosed as follows.

In one embodiment, fixed-length code. When the number of indices is known, the maximum bit number required to code consecutive copy_index can be fixed. For example, if the maximum number of consecutive indices is 9, the number of bits required to represent each number of consecutive indices is 4. Therefore first signalled value (i.e., 4) in example (1) is a fixed 4-bit code, 0100. The second signalled value (i.e., 2) is coded as 0010. In another embodiment, the number of consecutive indices can be binarized using truncated binary codes.

In yet another embodiment, the number of bits can be decided by (the maximum number of consecutive indices−1) since the number of consecutive indices is always larger than 0. In example (2) of the following table, the number of bits is 3 and the first signalled value, 4 is coded as 100 and the second signalled value, 2 is coded as 010.

TABLE 13

| Run type (0: copy_index, 1: copy_above) | Number of indices | Signalled values |
|---|---|---|
| (1) 000001000101 | 9 | 4, 2, 0, END |
| (2) 000001000 | 8 | 4, 2, END |

In yet another embodiment, adaptive fixed-length code and truncated binary code are used. When the number of indices is known, the maximum number of bits required to code consecutive copy_index can be fixed. Also, after parsing each consecutive copy_index, the maximum number of bits can be reduced by the number of consecutive copy_index. In example (1) of Table 13 with the maximum number of consecutive indices as 9, the first signalled value 4 is represented by a fixed 4-bit code, 0100. The second signalled value 2 can be represented by a fixed 3-bit code, 010 since the available number of indices is 4 (i.e., 9−(4+1)=4), which requires only 3 bits. Last signalled value 1 is coded by a fixed 1-bit code, 1. In another embodiment, the maximum number of bits can be determined by (number of indices−1) since the number of copy_index between two copy_above is always larger than 0. In example (2) of Table 13, the number of bits is 3 and the first signalled value 4 is coded as 100 and the second signalled value 2 is coded as 10. For both embodiments, truncated binary coding can be used.

In yet another embodiment, N-th order Exponential Golomb code can be used to code the number of consecutive indices. In this case, a number of contexts can be used. The order of exponential Golomb code and the remaining number of indices after parsing consecutive copy_index can be taken into consideration for binarization.

Similar to the coding for the runs of copy_index mode or copy_above mode, the number of consecutive indices can also be coded with MSB part and remaining part. Remaining part can be coded using fixed-length codes or truncated binary codes depending on the remaining number of indices after parsing the consecutive copy_index. Also a number of contexts can be used.

Context Formation for Palette Run_Type

In this application, the context formation of palette_run_type independent of the neighboring information or the previous decoded information is disclosed. In this case, the context formation of palette_run_type only depends on the scan order.

In one embodiment, the first palette run type uses an independent context set, and the rest palette run modes use other context sets.

In another embodiment, the first palette run mode uses a first context (e.g. context-0), and the rest palette run modes use a second context (e.g. context-1).

Binarization of Number of Indices (Num_Palette_Indices_Idc)

In SCM-4.0 palette index map coding, the number of indices as indicated by num_palette_indices_idc or similar syntax element is first signalled. To signal the number of indices, a variable (number of indices−palette size) is first derived. A mapping processed is then performed to map the (number of indices−palette size) to a "mapped value". The mapped value is binarized with the same binarization method as "coeff_abs_level_remaining" and signalled. The prefix part is coded using Truncated Rice (TR) code. The suffix part is coded using Exp-Golomb code. The Truncated Rice binarization process uses parameter, cRice Param, to derive the prefix part. For this binarization method, the input cParam is set to be 2+MaxPaletteIndex/6, where the variable MaxPaletteIndex specifies the maximum possible value for a palette index for the current block. However, the MaxPaletteIndex/6 needs a division operation (i.e., division by 6) or a look up table operation. Accordingly, an embodiment of the present invention sets cParam to be equal to 2+MaxPaletteIndex/M and M is a power-of-2 integer to avoid the need for the division operation. For example, M can be 4 or 8 and cParam can be derived as (2+(MaxPaletteIndex>>2)) or (2+(MaxPaletteIndex>>3)), where ">>" corresponds to the right-shift operation.

In another embodiment, the division by 6 operation for the Rice parameter derivation is avoid by assigning the Rice parameter to (2+(MaxPaletteIndex>>N)), where N can be integer number smaller than $\log_2$(MaxPaletteIndex), such as 3.

In another embodiment, the Rice parameter cRiceParam can be determined according to cRiceParam=(L+MaxPaletteIndex)>>N, N can be 0, 1, 2, . . . , MaxPaletteIndex, L is an integer. For example, L and N can be set to 24 and 3 respectively, and cParam becomes ((24+MaxPaletteIndex)>>3)=(3+(MaxPaletteIndex)>>3)).

It is also possible to binarize the syntax num_palette_indices_idc or similar syntax element using fixed-length binarization. It also can be binarized in a same way as palette_run, which is coded with or without contexts. It also can also be coded using $N^{th}$ exponential Golomb code.

Higher Throughput Coding for Palette Coding Mode

For palette coding, various syntax elements such as palette index, run types, number of runs and escape values have to be signalled. Some of these syntax elements are coded using context-adaptive binary arithmetic codes (CABAC), where the CABAC includes a context mode (i.e., regular mode) and a bypass mode. The context mode is more compression efficient. However, the processing speed is much slower compared to the bypass mode. Various techniques to improve the throughput rate of palette coding are disclosed.

In one embodiment, the palette coding syntax elements coded in the bypass mode are grouped together. Also, the palette coding syntax elements coded with the context mode are grouped together. Therefore, when a group of context-coded syntax elements are decoded, the throughput rate should be improved since the arithmetic decoder does not have to switch between different modes.

In one embodiment, a palette coding syntax element coded in the bypass mode should not be placed in the bitstream between two palette coding syntax elements coded with coding contexts.

In palette coding, a syntax element, palette_transpose_flag is used to specify whether the transpose process is applied to the associated palette indices of the current coding unit. When palette_transpose_flag is equal to 1, the transpose process is applied to the associated palette indices of the current coding unit. When palette_transpose_flag is equal to 0, the transpose process is not applied to the associated palette indices of the current coding unit. One aspect of the present invention addresses the location of palette_transpose_flag in the coded data for the current block.

In one embodiment, the palette_transpose_flag should not be placed in the bitstream between two palette coding syntax elements coded with bypass mode.

In one embodiment, the palette_transpose_flag can be coded after the last_palette_run_type_flag. For example, the location of palette_transpose_flag in JCTVC-T1005 can be moved to the location after last_palette_run_type_flag as shown in the Table 14 below, where the original palette_transpose_flag location is indicated by Note (14-1) and the new palette_transpose_flag location according to this embodiment is indicated by Note (14-2). In Table 14, where the text enclosed in a box indicates deletion.

TABLE 14

|  | Note |
|---|---|
| if( MaxPaletteIndex > 0 ) {<br>　　palette_transpose_flag<br>　　num_palette_indices_idc<br>　　for( i=0; i < NumPaletteIndices; i++ ) {<br>　　　　palette_index_idc<br>　　　　PaletteIndexIdc[ i ] = palette_index_idc<br>　　}<br>　　last_palette_run_type_flag<br>　　palette_transpose_flag<br>} | (14-1)<br><br><br><br><br><br><br><br>(14-2) |

According to other embodiments, the palette_transpose_flag can be coded in other locations of the bitstream for the block. For example, the palette_transpose_flag can be coded after palette_run_type_flag, palette_run_msb_id_plus, or palette_run_refinement_bits.

In one embodiment, the palette_transpose_flag can be coded by the bypass mode or the palette_transpose_flag can be derived by the decoder implicitly.

In one embodiment, the last_palette_run_type_flag can be coded by in the bypass mode.

Figure 2:
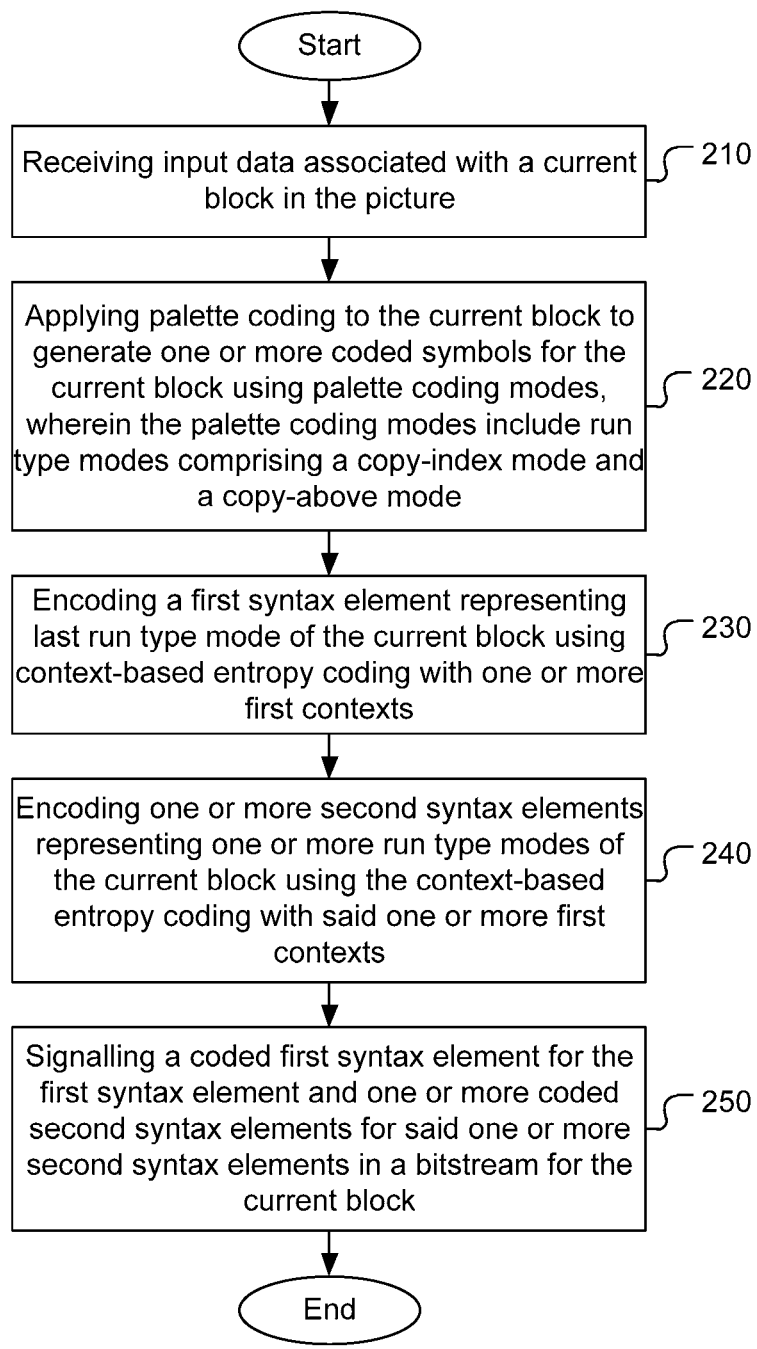
FIG. 2 illustrates an exemplary flow chart of palette coding according to an embodiment of the present invention, where context-based entropy coding of syntax element for the last run type mode and context-based entropy coding of syntax element for the run type mode share the same context.

FIG. 2 illustrates an exemplary flow chart of palette coding according to an embodiment of the present invention, where context-based entropy coding of syntax element for the last run type mode and context-based entropy coding of syntax element for the run type mode share the same context. The encoder receives input data associated with a current block in the picture in step 210. Palette coding is applied to the current block to generate one or more coded symbols for the current block using palette coding modes in step 220, where the palette coding modes include run type modes comprising a copy-index mode and a copy-above mode. A first syntax element representing last run type mode of the current block is encoded using context-based entropy coding with one or more first contexts in step 230. One or more second syntax elements representing one or more run type modes of the current block are encoded using the context-based entropy coding with said one or more first contexts in step 240. A coded first syntax element for the first syntax element and one or more coded second syntax elements for said one or more second syntax elements are signalled in a bitstream for the current block in step 250.

The decoder flowchart corresponding to the encoder in FIG. 2 can be derived using an inverse process of the flowchart in FIG. 2.

Figure 3:
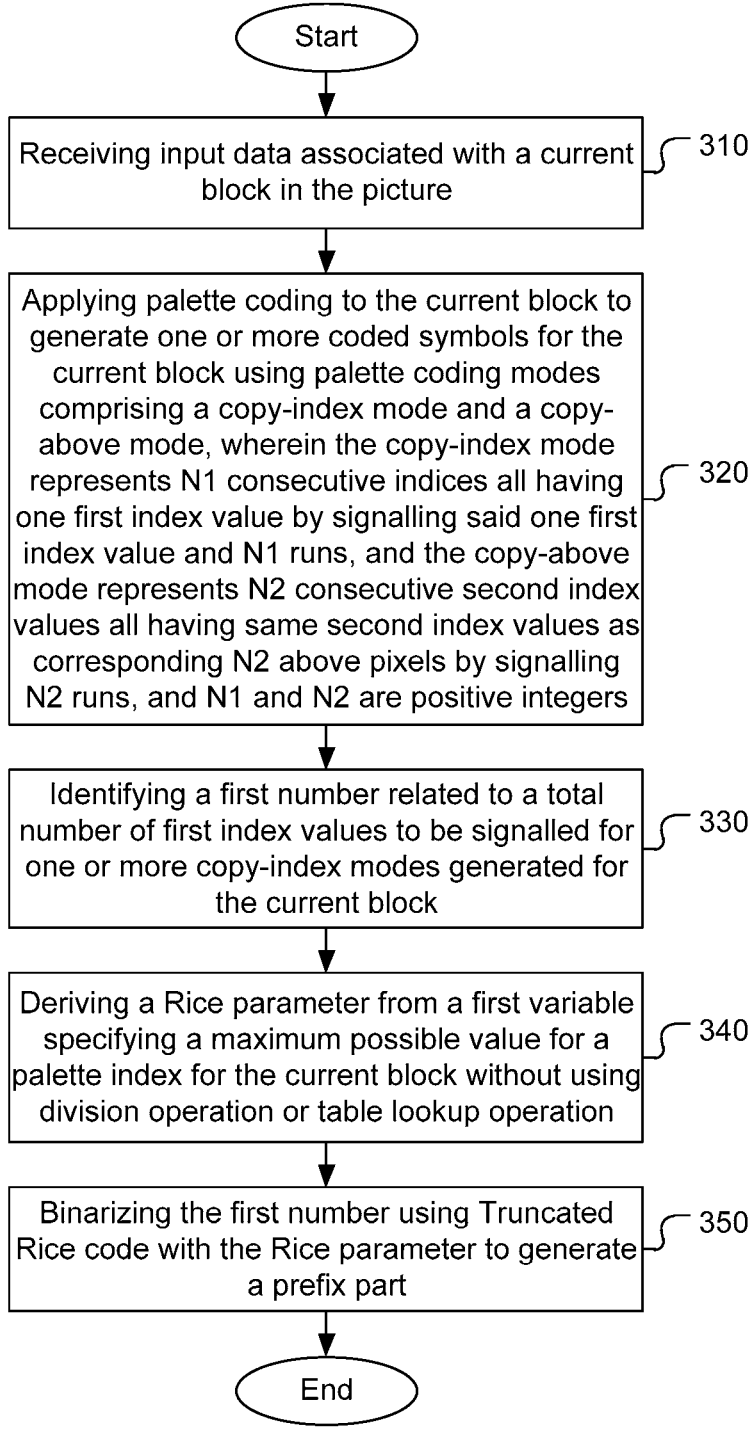
FIG. 3 illustrates an exemplary flow chart of palette coding according to an embodiment of the present invention, where the Rice parameter for binarization of the number of indices is derived with reduced complexity.

FIG. 3 illustrates an exemplary flow chart of palette coding according to an embodiment of the present invention, where the Rice parameter for binarization of the number of indices is derived with reduced complexity. The encoder receives input data associated with a current block in the picture in step 310. Palette coding is applied to the current block to generate one or more coded symbols for the current block using palette coding modes comprising a copy-index mode and a copy-above mode in step 320. The copy-index mode represents N1 consecutive indices all having one first index value by signalling said one first index value and N1 runs, and the copy-above mode represents N2 consecutive second index values all having same second index values as corresponding N2 above pixels by signalling N2 runs, and N1 and N2 are positive integers. A first number related to a total number of first index values to be signalled for one or more copy-index modes generated for the current block is identified in step 330. A Rice parameter is derived from a first variable specifying a maximum possible value for a palette index for the current block without using division operation or table lookup operation in step 340. The first number is binarized using Truncated Rice code with the Rice parameter to generate a prefix part in step 350.

The decoder flowchart corresponding to the encoder in FIG. 3 can be derived using an inverse process of the flowchart in FIG. 3.

Figure 4:
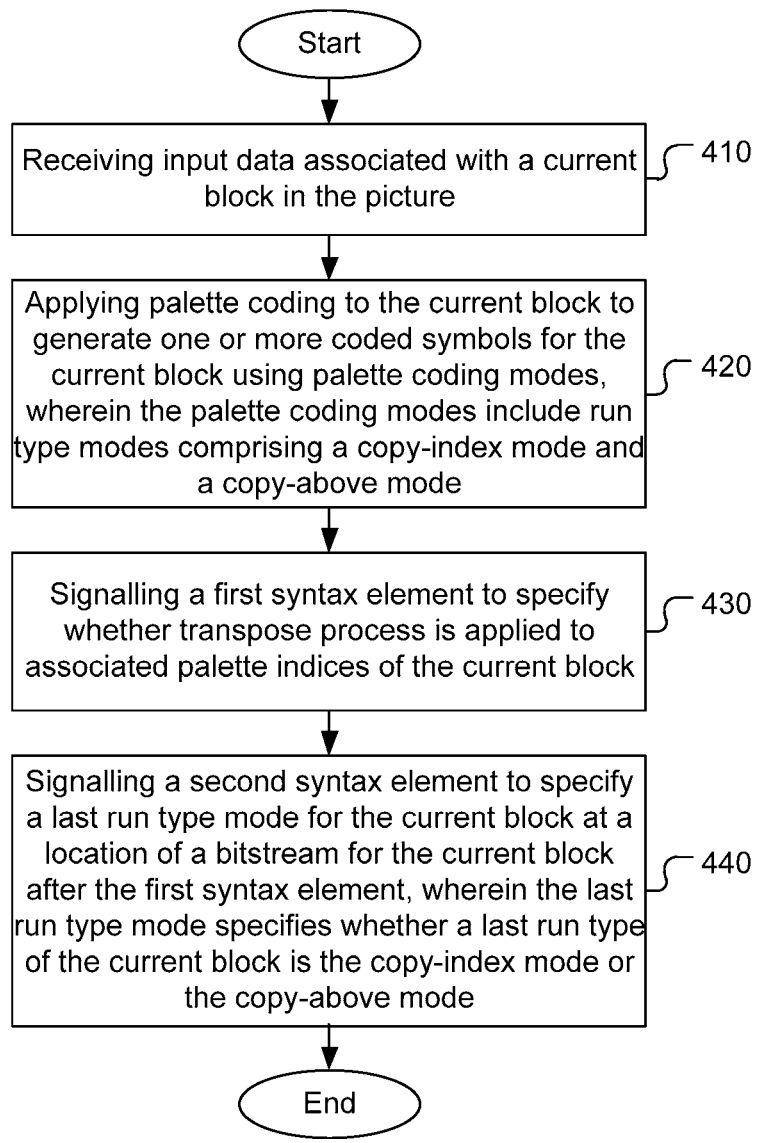
FIG. 4 illustrates an exemplary flow chart of palette coding according to an embodiment of the present invention, where the syntax element to specify whether transpose process is applied to associated palette indices of the current block is signalled in the bitstream for the current block in a location after the syntax element to specify a last run type mode for the current block.

FIG. 4 illustrates an exemplary flow chart of palette coding according to an embodiment of the present invention, where the syntax element to specify whether transpose process is applied to associated palette indices of the current block is signalled in the bitstream for the current block in a location after the syntax element to specify a last run type mode for the current block. The encoder receives input data associated with a current block in the picture in step 410. Palette coding is applied to the current block to generate one or more coded symbols for the current block using palette coding modes in step 420. The palette coding modes include run type modes comprising a copy-index mode and a copy-above mode. A first syntax element to specify whether transpose process is applied to associated palette indices of the current block is signalled in step 430. A second syntax element to specify a last run type mode for the current block is signalled at a location of a bitstream for the current block after the first syntax element in step 440. The last run type mode specifies whether a last run type of the current block is the copy-index mode or the copy-above mode.

The decoder flowchart corresponding to the encoder in FIG. 4 can be derived using an inverse process of the flowchart in FIG. 4.

The above description is presented to enable a person of ordinary skill in the art to practice the present invention as provided in the context of a particular application and its requirement. Various modifications to the described embodiments will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed. In the above detailed description, various specific details are illustrated in order to provide a thorough understanding of the present invention. Nevertheless, it will be understood by those skilled in the art that the present invention may be practiced.

Embodiment of the present invention as described above may be implemented in various hardware, software codes, or a combination of both. For example, an embodiment of the present invention can be one or more electronic circuits integrated into a video compression chip or program code integrated into video compression software to perform the processing described herein. An embodiment of the present invention may also be program code to be executed on a Digital Signal Processor (DSP) to perform the processing described herein. The invention may also involve a number of functions to be performed by a computer processor, a digital signal processor, a microprocessor, or field programmable gate array (FPGA). These processors can be configured to perform particular tasks according to the invention, by executing machine-readable software code or firmware code that defines the particular methods embodied by the invention. The software code or firmware code may be developed in different programming languages and different formats or styles. The software code may also be compiled for different target platforms. However, different code formats, styles and languages of software codes and other means of configuring code to perform the tasks in accordance with the invention will not depart from the spirit and scope of the invention.

The invention may be embodied in other specific forms without departing from its spirit or essential characteristics. The described examples are to be considered in all respects only as illustrative and not restrictive. The scope of the invention is therefore, indicated by the appended claims rather than by the foregoing description. All changes which come within the meaning and range of equivalency of the claims are to be embraced within their scope.

The invention claimed is:

1. A method of palette index map decoding for blocks in a picture, comprising:
    receiving input bitstream associated with a current block in the picture;
    deriving a Rice parameter from a first variable, MaxPaletteIndex, specifying a maximum possible value for a palette index for the current block without using division operation or table lookup operation;
    parsing, from the input bitstream, a coded first number corresponding to a first number related to a total number of first index values signalled for one or more copy-index modes generated for the current block by applying palette coding to the current block, wherein the copy-index mode represents C consecutive indices all having one first index value by signalling said one first index value and C runs and C is a positive integer;
    recovering the first number from the coded first number by applying decoding process including applying truncated Rice decoding with the Rice parameter to a prefix part of the coded first number; and applying palette decoding to recover the current block using information including the first number, wherein said deriving the Rice parameter from the first variable assigns the Rice parameter equal to (2+MaxPaletteIndex/M) and M is a power-of-2 integer to avoid a need for the division operation related to MaxPaletteIndex/M; or
    wherein said deriving the Rice parameter from the first variable assigns the Rice parameter equal to (2+(MaxPaletteIndex >>N)), and wherein N is a positive integer and ">>" corresponds to a right-shift operation; or
    wherein said deriving the Rice parameter from the first variable assigns the Rice parameter equal to ((L+ MaxPaletteIndex) >>N), and wherein L and N are positive integers and ">>" corresponds to a right-shift operation.

2. A method of palette index map coding for blocks in a picture, comprising:
    receiving input data associated with a current block in the picture;
    applying palette coding to the current block to generate one or more coded symbols for the current block using palette coding modes comprising a copy-index mode and a copy-above mode, wherein the copy-index mode represents C1 consecutive indices all having one first index value by signalling said one first index value and C1 runs, and the copy-above mode represents C2 consecutive second indices all having same second index values as corresponding C2 above pixels by signalling C2 runs, and C1 and C2 are positive integers;

identifying a first number related to a total number of first index values to be signalled for one or more copy-index modes generated for the current block;

deriving a Rice parameter from a first variable specifying a maximum possible value for a palette index for the current block without using division operation or table lookup operation; and binarizing the first number using Truncated Rice code with the Rice parameter to generate a prefix part, wherein said deriving the Rice parameter from the first variable assigns the Rice parameter corresponding to (2+MaxPaletteIndex/M) and M is a power-of-2 integer to avoid a need for the division operation related to MaxPaletteIndex/M; or wherein said deriving the Rice parameter from the first variable assigns the Rice parameter corresponding to (2+(MaxPaletteIndex >>N)), and wherein N is a positive integer and ">>" corresponds to a right-shift operation; or wherein said deriving the Rice parameter from the first variable assigns the Rice parameter corresponding to ((L+MaxPaletteIndex) >>N), and wherein L and N are positive integers and ">>" corresponds to a right-shift operation.

3. A method of palette index map decoding for blocks in a picture, comprising:

receiving input bitstream associated with a current block in the picture;

deriving a Rice parameter from a first variable, MaxPaletteIndex, specifying a maximum possible value for a palette index for the current block without using division operation or table lookup operation;

parsing, from the input bitstream, a coded first number corresponding to a first number related to a total number of first index values signalled for one or more copy-index modes generated for the current block by applying palette coding to the current block, wherein the copy-index mode represents C consecutive indices all having one first index value by signalling said one first index value and C runs and C is a positive integer;

recovering the first number from the coded first number by applying decoding process including applying truncated Rice decoding with the Rice parameter to a prefix part of the coded first number; and applying palette decoding to recover the current block using information including the first number, wherein:

said deriving the Rice parameter from the first variable assigns the Rice parameter corresponding to (2+MaxPaletteIndex/M) and M is a power-of-2 integer to avoid a need for the division operation related to MaxPaletteIndex/M; or said deriving the Rice parameter from the first variable assigns the Rice parameter corresponding to (2+(MaxPaletteIndex >>N)), and wherein N is a positive integer and ">>" corresponds to a right-shift operation; or said deriving the Rice parameter from the first variable assigns the Rice parameter corresponding to ((L+MaxPaletteIndex) >>N), and wherein L and N are positive integers and ">>" corresponds to a right-shift operation.

\* \* \* \* \*